United States Patent
Liu et al.

(10) Patent No.: US 11,947,498 B2
(45) Date of Patent: Apr. 2, 2024

(54) DE-DUPLICATION OF DATA IN EXECUTABLE FILES IN A CONTAINER IMAGE

(71) Applicant: INTERNATIONAL BUSINESS MACHINES CORPORATION, Armonk, NY (US)

(72) Inventors: Dong Hui Liu, Beijing (CN); Peng Hui Jiang, Beijing (CN); Jing Lu, Beijing (CN); Xiao Yan Tang, Beijing (CN); Jun Su, Beijing (CN); Jia Yu, Beijing (CN); Yong Yin, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/663,182

(22) Filed: May 12, 2022

(65) Prior Publication Data
US 2023/0367745 A1 Nov. 16, 2023

(51) Int. Cl.
*G06F 16/00* (2019.01)
*G06F 16/174* (2019.01)

(52) U.S. Cl.
CPC .............................. *G06F 16/1756* (2019.01)

(58) Field of Classification Search
CPC .................................................. G06F 16/1756
See application file for complete search history.

(56) References Cited

U.S. PATENT DOCUMENTS

| 8,589,640 | B2 | 11/2013 | Colgrove |
| 9,602,283 | B1 | 3/2017 | Chandra |
| 10,061,798 | B2 | 8/2018 | Colgrove |
| 10,740,132 | B2 | 8/2020 | Goel |
| 11,005,906 | B2 * | 5/2021 | Thomas ............... H04L 65/762 |

(Continued)

FOREIGN PATENT DOCUMENTS

| CN | 103959264 A | 7/2014 |
| CN | 111492347 A | 8/2020 |

(Continued)

OTHER PUBLICATIONS

Mell et al., "The NIST Definition of Cloud Computing", Recommendations of the National Institute of Standards and Technology, NIST Special Publication 800-145, Sep. 2011, 7 pages.

*Primary Examiner* — Syed H Hasan
(74) *Attorney, Agent, or Firm* — Robert R. Aragona

(57) ABSTRACT

Methods, systems, and computer program products for de-duplicating data in executable files in a container image are disclosed. The method may include receiving a request to read a file in a first layer in a container image including a plurality of layers, wherein the file is a delta file which is from an updated executable file based on a base executable file, the base executable file is in a lower layer than the first layer in the container image, and the delta file includes block mappings between the updated executable file and the base executable file and different data between the two files, and blocks included in the two files are based on respective file structure. The method may also include restoring the updated executable file based on the delta file and the base executable file. The method may further include returning data in the updated executable file.

20 Claims, 10 Drawing Sheets

(56) References Cited

U.S. PATENT DOCUMENTS

| | | | |
|---|---|---|---|
| 2007/0022264 A1* | 1/2007 | Bromling | G06F 11/2071 |
| | | | 711/168 |
| 2013/0144846 A1 | 6/2013 | Chhaunker | |
| 2016/0283505 A1 | 9/2016 | Rao | |
| 2017/0118283 A1 | 4/2017 | Liu | |
| 2018/0060187 A1* | 3/2018 | Chavda | G06F 11/1448 |
| 2018/0088926 A1* | 3/2018 | Abrams | H04L 67/568 |
| 2018/0253361 A1* | 9/2018 | Dhatrak | G06F 11/328 |
| 2018/0293374 A1* | 10/2018 | Chen | G06F 9/45558 |
| 2018/0349150 A1 | 12/2018 | Wong | |
| 2023/0119364 A1* | 4/2023 | Wang | G06F 16/185 |
| | | | 707/626 |

FOREIGN PATENT DOCUMENTS

| | | | | |
|---|---|---|---|---|
| CN | 112104725 A | | 12/2020 | |
| CN | 112749137 A | | 5/2021 | |
| WO | WO-2023217165 A1 * | | 11/2023 | G06F 16/1756 |

\* cited by examiner

DE-DUPLICATION OF DATA IN EXECUTABLE FILES IN A CONTAINER IMAGE

BACKGROUND

The present invention relates to container image management, and more specifically, to methods, systems and computer program products for de-duplicating data in executable files in a container image.

With the rapid adoption of migrating applications to the cloud, containers become the de facto standard for application delivery. Container orchestration software is used to provision containers, instantiate a set of containers, reschedule containers, scale up or down a set of containers, and the like. A container is instantiated from a container image, which may consist of a series of read-only layers.

When constructing a container image, a plurality of layers are generated for launching containers. A container image is a key factor in transferring and loading data in a cloud environment. Recent studies have shown that there are many container images that contain many duplicates or near duplicates of data. Some duplicates are binaries for execution, and some duplicates are artifacts for operation. The duplicates or near duplicates of data may take up more storage space and may require de-duplication.

SUMMARY

The present invention provides a computer-implemented method, system, and computer program product for de-duplicating data in executable files in a container image. The method may comprise receiving a request to read a file in a first layer in a container image including a plurality of layers. The file may be a delta file which is from an updated executable file based on a base executable file, where the base executable file is in a lower layer than the first layer in the container image. The delta file may comprise block mappings between the updated executable file and the base executable file and different data between the updated executable file and the base executable file, where blocks comprised in the updated executable file and the base executable file may be based on a respective file structure of the updated executable file and the base executable file. The method may also comprise restoring the updated executable file based on the delta file and the base executable file. The method may further comprise returning data in the updated executable file as a response of the request.

The above summary is not intended to describe each illustrated embodiment or every implementation of the present invention.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
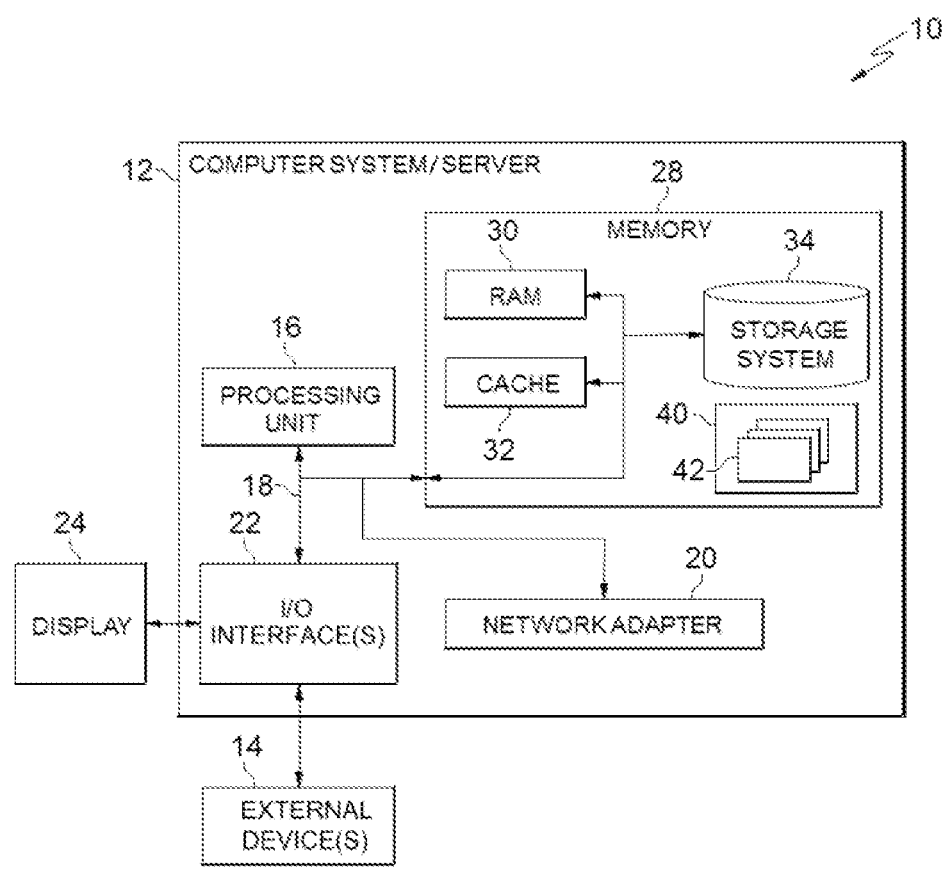
FIG. 1 depicts a cloud computing node according to some embodiments of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure comprises a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may comprise at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure comprising network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure comprising networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can comprise operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that comprises a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computer system environments or configurations. Examples of well-known computer systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 12 may be described in the general context of computer system-executable instructions, such as program modules, being executed by a computer system. Generally, program modules may comprise routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components comprising system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures comprise Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and includes both volatile and non-volatile media, as well as removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, database system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of the embodiments of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of the embodiments of the present invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Additionally, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples may include, but are not limited to: microcode, device drivers, redundant processing units, external disk drive arrays, RAID systems, tape drives, and data archival database systems, etc.

Figure 2:
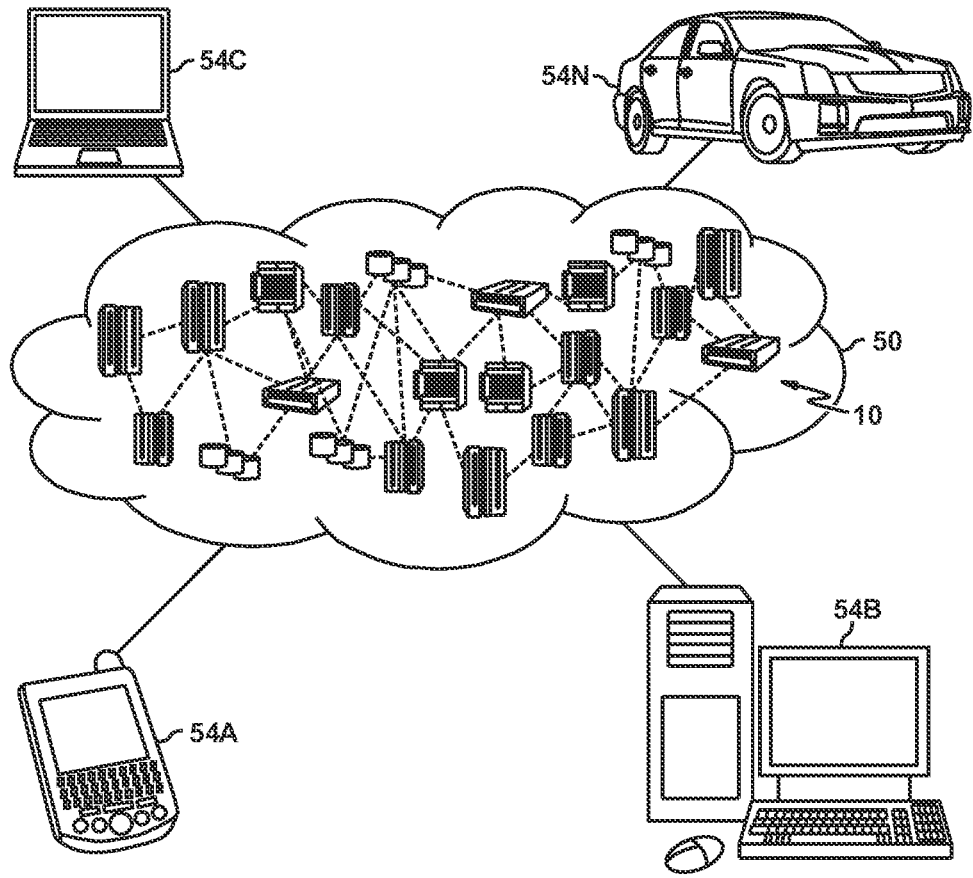
FIG. 2 depicts a cloud computing environment according to some embodiments of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
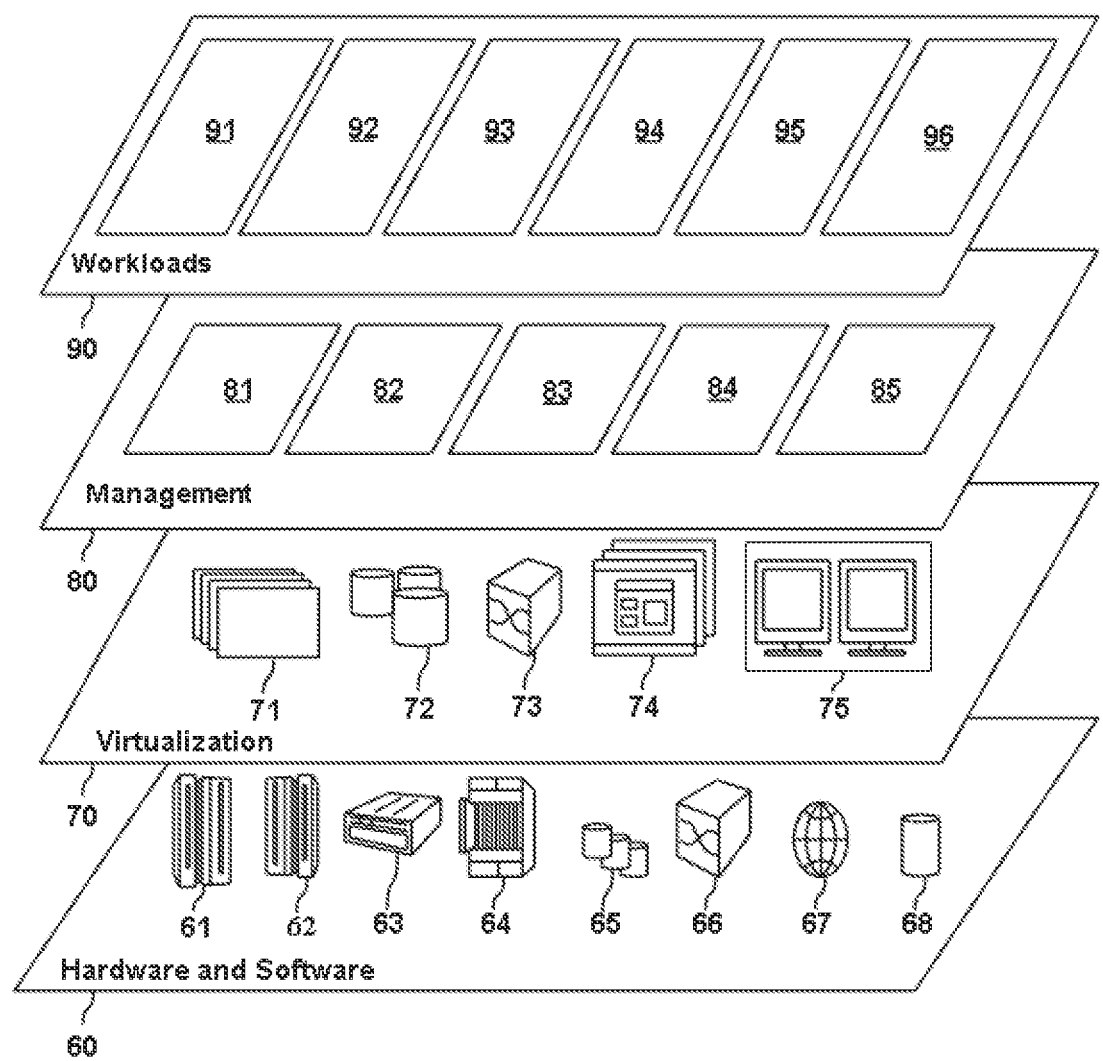
FIG. 3 depicts abstraction model layers according to some embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 comprises hardware and software components. Examples of hardware components include: mainframes 61; RISC (Reduced Instruction Set Computer) architecture based servers 62; servers 63; blade servers 64; storage devices 65; and networks and networking components 66. In some embodiments, software components comprise network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and container image processing 96.

It should be noted that the container image processing 96 according to embodiments of the present invention could be implemented by computer system/server 12 of FIG. 1. In the context of the present invention, a container image may refer to an image that may be deployed in a container.

Figure 4:
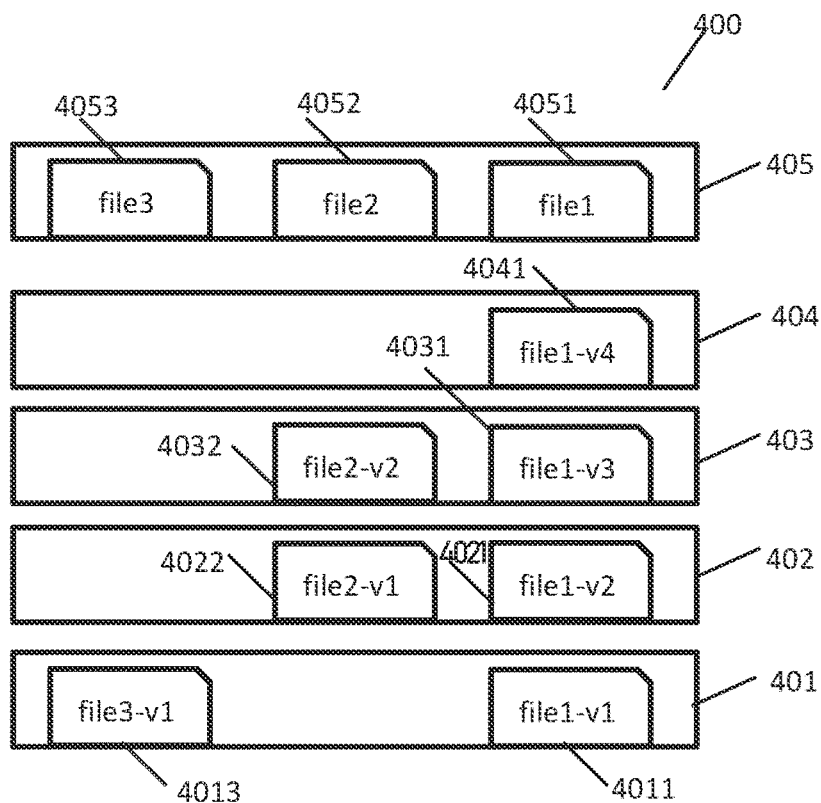
FIG. 4 depicts an architecture of a conventional container image according to some embodiments of the present invention.

With developments of the container technology and the software reuse technology, codes for implementing a specific operation may be packaged into an individual layer in a container image, and then the individual layer may be reused in a plurality of container images. A container image may include a series of read-only layers, and at least one file may be added in each layer. FIG. 4 depicts an architecture of a conventional container image 400. As shown in FIG. 4, the container image 400 may include a plurality of layers 401, 402, 403 and 404 where the layer 401 (also referred to as a base layer) includes two files, e.g., a file1-v1 4011 and a file3-v1 4013. Furthermore, the layers 402, 403, and 404, which are located higher than the base layer 401, may be referred to as upper layers. The layer 402 may include two files, e.g., a file1-v2 4021 and a file2-v1 4022. The layer 403 may include two files, e.g., a file1-v3 4031 and a file2-v2

4032. The layer 404 may include one file, e.g., a file1-v4 4041. It is to be understood that the above FIG. 4 just provides an example architecture of the container image 400. In other embodiments, the container image 400 may include more or fewer layers and each layer may include more or fewer files. In FIG. 4, the file1-v1 4011, the file1-v2 4021, the file1-v3 4031 and the file1-v4 4041 are different versions of a file named file1 4051 and these four files may include duplicated data. In addition, the file2-v1 4022 and the file2-v2 4032 are different versions of a file named file2 4052, and these two files may include duplicated data. From a user's point of view, the container image 400 comprises three files, e.g., file 1 4051, file 2 4052 and file 3 4053 as shown in 405.

It can be understood that layers with the same or similar data may cost extra storage space. By now, solutions have been proposed for detecting the duplicated layers between different container images or detecting the duplicated files between different layers in a container image, and then only one copy of the duplicated layers or one copy of the duplicated files are stored for reducing the storage space. However, as shown in FIG. 4, the file1-v1 4011, the file1-v2 4021, the file1-v3 4031 and the file1-v4 4041 are similar files but not the same files. Thus, all four files are stored in respective layers, as are the file2-v1 4022 and the file2-v2 4032. If only one copy of the duplicated data in these similar files is stored in the container image 400, the storage cost will be further reduced. In addition, in such kind of container image 400 in which only one copy of the duplicated data in these similar files is transferred over a fixed-bandwidth network, the transfer time can also be reduced.

To de-duplicate data among similar files, these similar files may be split into blocks with the same size in the conventional technology. However, it will be difficult to determine the size of the blocks for these similar executable files. Furthermore, where the data duplication ratio is relatively low, the performance of de-duplication cannot be satisfied.

According to some embodiments of this invention, these similar files in different layers in a container image may be split into a respective plurality of blocks based on respective file structures of these similar files, of which one file is defined as a base executable file. The blocks in each of other files may be compared with the blocks in the base executable file and respective same blocks and respective different blocks are identified. A delta file for each of the other files are generated based on the block comparison. Then, each delta file may replace the corresponding file in the corresponding layer in the container image to reduce the storage cost. When a container image comprising a delta file is deployed in a container, the delta file can be read and restored to the corresponding file automatically, and the restoration is transparent to users.

Figure 5:
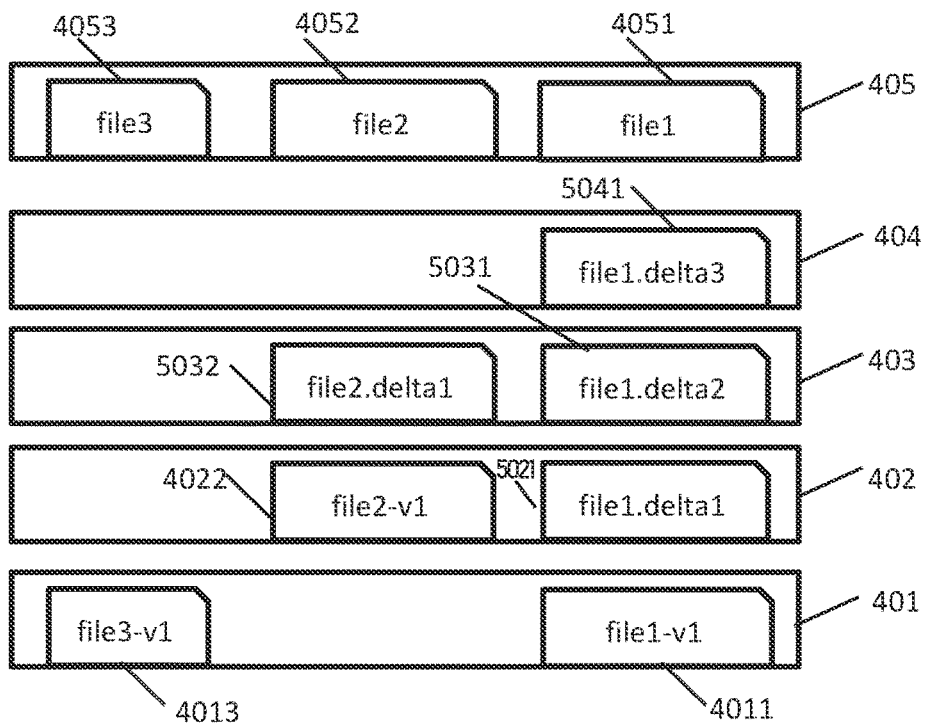
FIG. 5 depicts a proposed architecture of a container image according to some embodiments of the present invention.

FIG. 5 depicts a proposed architecture of the container image 400 according to some embodiments of the present invention. In FIG. 5, the file1-v1 4011 is defined as a base executable file for the file1-v2 4021, the file1-v3 4031 and the file1-v4 4041, and the file2-v1 4022 is defined as a base executable file for the file2-v2 4032. After block splitting operations and block comparison operations, a file1.delta1 5021 corresponding to the file1-v2 4021, a file1.delta2 5031 corresponding the file1-v3 4031, a file1.delta3 5041 corresponding to the file1-v4 4041, and a file2.delta1 5032 corresponding to the file2-v2 4032 are generated. When generating the layer 402 of the container image 400, the file1.delta1 5021 may replace the file1-v2 4021. When generating the layer 403 of the container image 400, the file1.delta2 5031 may replace the file1-v3 4031 and the file2.delta1 5032 may replace the file2-v2 4032. When generating the layer 404 of the container image 400, the file1.delta3 5041 may replace the file1-v4 4041. The user's point of view 405 may not be changed. It is to be understood that the above FIG. 5 just provides a proposed example architecture of the container image 400. In other embodiments, each executable file may include more or fewer classes, functions or libraries, so each executable file may include more or fewer sections based on the structure thereof.

Figure 6:
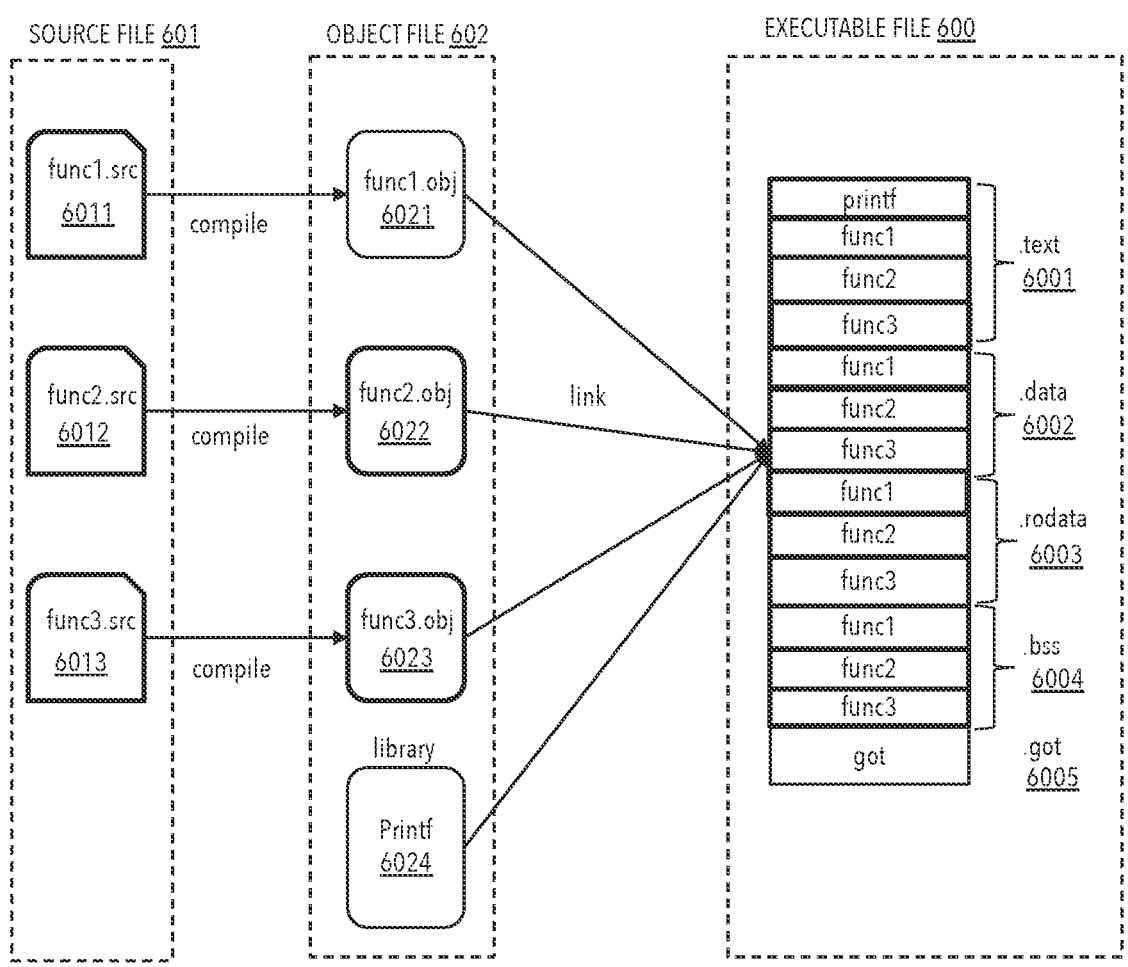
FIG. 6 depicts a process of obtaining an executable file from a source file and a schematic structure of the executable file according to some embodiments of the present invention.

In the following, the file1-v1 4011 is taken as an example of a base executable file, and the file1-v2 4021 is taken as an example of an updated executable file of the base executable file. As mentioned before, the file1-v1 4011 and the file1-v2 4021 may be different versions of the executable file named file1 4051 and may share the similar file architecture. FIG. 6 depicts a process of obtaining an executable file 600 from a source file 601 and a schematic structure of an executable file 600 according to some embodiments of the present invention. As shown in FIG. 6, the source file 601 includes three source functions, e.g., a function named func1.src 6011, a function named func2.src 6012, and a function named func3.src 6013. When the three functions of the source file 601 are compiled, an object file 602, which includes an object function named func1.obj 6021, an object function named func2.obj 6022, and an object function named func3.obj 6023, as well as a library such as Printf 6024, may be generated. After the object file 602 including the four object functions is linked by a linker, the executable file 600 may be generated. The executable file 600 may include five parts, e.g. a part named .text 6001, a part named .data 6002, a part named .rodata 6003, a part named .bss 6004, and a part named .got 6005. Each part may include corresponding functions. For example, .text 6001 may include text of the functions 1-3 and the text of the Printf 6024, i.e., four sections total. The executable file 600 may include 14 sections. Thus, the executable file 600 may be split into 14 blocks corresponding to the 14 sections according to the structure thereof. Those skilled in the art may understand that the above splitting method may utilize the specific structure of an executable file. If other files included in a container image have a similar character, the method in some embodiments of the present invention can also be applied.

Figure 7:
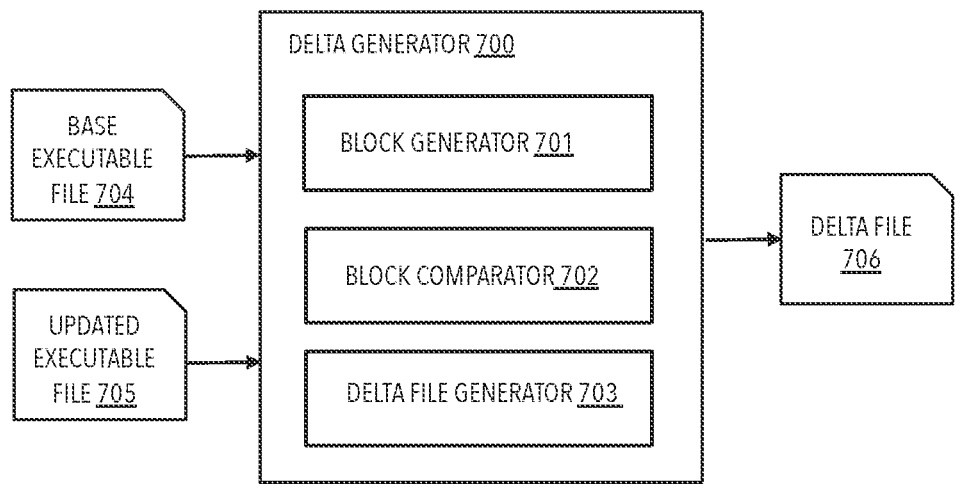
FIG. 7 depicts an example diagram for a delta generator according to some embodiments of the present invention.

The above-mentioned block splitting operation and block comparing operation may be implemented by a delta generator. FIG. 7 depicts an example diagram for a delta generator 700 according to some embodiments of the present invention. The delta generator 700 can be a component of a tool for generating container images. When the tool for generating container images adds an updated executable file 705 into an upper layer higher than the base layer including the base executable file 704 in a container image, the delta generator 700 may generate a delta file 706 for the updated executable file 705 and may then add the generated delta file 706 to the upper layer. As shown in FIG. 7, the delta generator 700 may comprise three components, e.g., a block generator 701, a block comparator 702 and a delta file generator 703. The block generator 701 may be configured to split each of the updated executable files 705 and the base executable file 704 into a respective plurality of blocks according to respective sections comprised thereof and obtain locations of the respective plurality of blocks of the updated executable file 705 and the base executable file 704. The size of each block may vary as the size of each section may vary. A location of a block may be either a location of the block in the container image or a location of the block in the updated executable file 705 or the base executable file 704. In the latter case, the location of the file may also be indicated. The block comparator 702 may be configured to compare data in the respective blocks in both the updated executable file 705 and the base executable file 704. The delta file generator 703 may be configured to generate the delta file 706 corresponding to the updated executable file 705 based on results from the block comparator 702.

Figure 8:
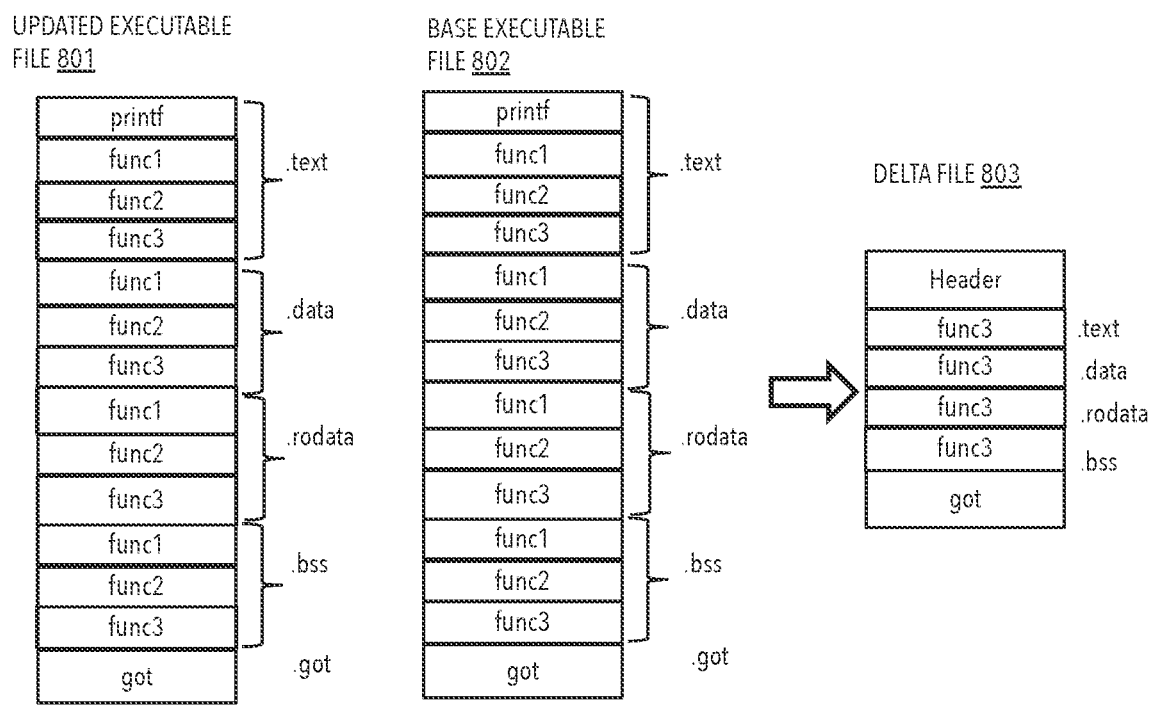
FIG. 8 depicts an example process for generating a delta file based on example file structures of a base executable file and an updated executable file according to some embodiments of the present invention.

FIG. 8 depicts an example process for generating a delta file 803 based on example file structures of a base executable file 802 and an updated executable file 801 according to some embodiments of the present invention. As shown in FIG. 8, both the base executable file 802 and the updated executable file 801 may include 14 sections, as both are different versions of a same executable file. The updated executable file 801 may only update the func3.src 6013 compared with the base executable file 802. In some embodiments, both the base executable file 802 and the updated executable file 801 may be complied and linked by a compiler and a linker to get the respective 14 sections. In other words, the block generator 701 may get the respective 14 sections of the base executable file 802 and the updated executable file 801 from the linker (such as ld on Linux® (Linux and all Linux-based trademarks and logos are trademarks or registered trademarks of Linus Torvalds and/or its affiliates) or binder API on z/OS® (z/OS and all z/OS-based trademarks and logos are trademarks or registered trademarks of International Business Machines Corporation and or its affiliates)). Those skilled in the art may understand that the block generator 701 may use other methods to get the 14 sections of the base executable file 802 and the updated executable file 801.

In some embodiments, the block comparator 702 may compare data in the respective blocks in both the updated executable file 801 and the base executable file 802 after the block generator 701 to get the respective blocks thereof. In some embodiments, the block comparator 702 may compute each digest of each block in the base executable file 802. Then for each specific block in the updated executable file 801, the block comparator 702 may compute a first digest of the specific block in the updated executable file 801, then compare the first digest with each digest of each block in the base executable file 802. If the first digest is the same as a second digest of a second block in the base executable file 802, the block comparator 702 may determine the specific block and the second block are the paired blocks, e.g., the same blocks. If the first digest is different from any digest of any block in the base executable file 802, the block comparator 702 may determine that the specific block is in the different blocks. After the loop ends for all blocks in the updated executable file 801, the block comparator 702 may obtain a delta file 803 based on the paired blocks and the different blocks.

Referring to FIG. 8, for example, the block comparator 702 may compute each digest of each block in the base executable file 802. Then for each specific block in the updated executable file 801, the block comparator 702 may compute a first digest of the specific block in the updated executable file 801, then compare the first digest with each digest of each block in the base executable file 802. If the first digest is the same as a second digest of a second block in the base executable file 802, the block comparator 702 may determine the specific block and the second block are paired blocks (e.g., two blocks named printf are the paired blocks, and two blocks named fund are the paired blocks, etc.). If the first digest is different from any digest of any block in the base executable file 802, the block comparator 702 may determine that the specific block is in the different blocks (e.g., the blocks named func3 are in the different blocks). Then the block comparator 702 may determine that there are five different blocks named func3.text, func3.data, func3.rodata, func3.bss and "got", respectively, and nine paired blocks named printf, func1.text, func1.data, func1.rodata, func1.bss, func2.text, func2.data, func2.rodata, and func2.bss, respectively. After the loop ends for all blocks in the updated executable file 801, the block comparator 702 may then obtain a delta file 803 based on the paired blocks and the different blocks.

In some embodiments, the block comparator 702 may, when comparing data in the respective blocks in both the updated executable file 801 and the base executable file 802, obtain each size of each block in the base executable file 802. Then for each specific block in the updated executable file 801, the block comparator 702 may obtain a first size of the specific block in the updated executable file 801, then compare the first size with each size of each block in the base executable file 802. If the first size is the same as a second size of a second block in the base executable file 802, the block comparator 702 may further determine whether the specific block and the second block are the paired blocks or the different blocks by comparing data comprised thereof. If the first size is different from any size of any block in the base executable file 802, the block comparator 702 may determine that the specific block is in the different blocks. After the loop ends for all blocks in the updated executable file 801, the block comparator 702 may then obtain a delta file 803 based on the paired blocks and the different blocks. Those skilled in the art may find other comparative methods which are in the scope of the present invention.

In some embodiments, the delta file 803 may include block mappings between the updated executable file 801 and the base executable file 802, and the different data between the updated executable file 801 and the base executable file 802, i.e., the data in the different blocks in the updated executable file 801.

Figure 9:
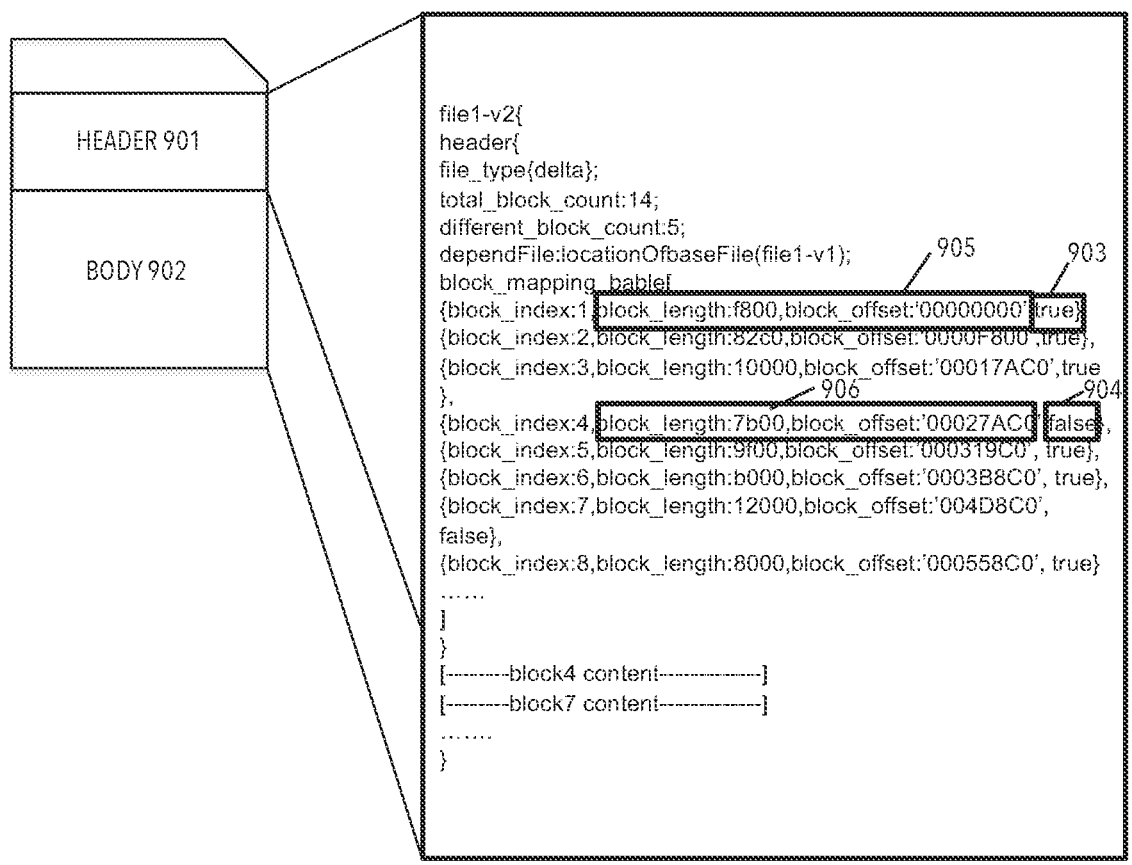
FIG. 9 depicts an example file format for a delta file according to some embodiments of the present invention.

In some embodiments, the delta file 803 may comprise a header and a body. The header may comprise the mapping between the updated executable file 801 and the base executable file 802. The mapping may include indications of paired blocks with the same data between the updated executable file 801 and the base executable file 802, indications of different blocks in the updated executable file 801 with different data from blocks in the base executable file 802, locations of the paired blocks of the base executable file 802, locations of the different blocks of the updated executable file 801, and data in each of the different blocks. FIG. 9 depicts an example file format for the delta file 803 according to some embodiments of the present invention. Referring to FIG. 9, the delta file 803 may include a header 901 and a body 902. In the header 901, text box 903 may indicate a paired block with the same data between the updated executable file 801 and the base executable file 802 (block_index:1), and text box 905 may indicate a location of the paired block of the base executable file 802. Text box 904 may indicate a different block in the updated executable file 801 with different data from blocks in the base executable file 802 (block_index:4), and text box 906 may indicate a location of the different block of the updated executable file 801. In the body 902, data in each of the different blocks are included. Those skilled in the art may understand that FIG. 9 just shows an exemplary file format for the delta file 803, and that other file formats can be defined. From the file structure of FIG. 9, it can be determined that only one copy of duplicated data in each of nine paired blocks with the same data included in the base executable file 802 and the updated executable file 801 is stored in the container image, which may reduce a great deal of storage space taken up by the container image. Also, when the container image is transmitted between computers, the transmission time may be saved with the same bandwidth.

Figure 10:
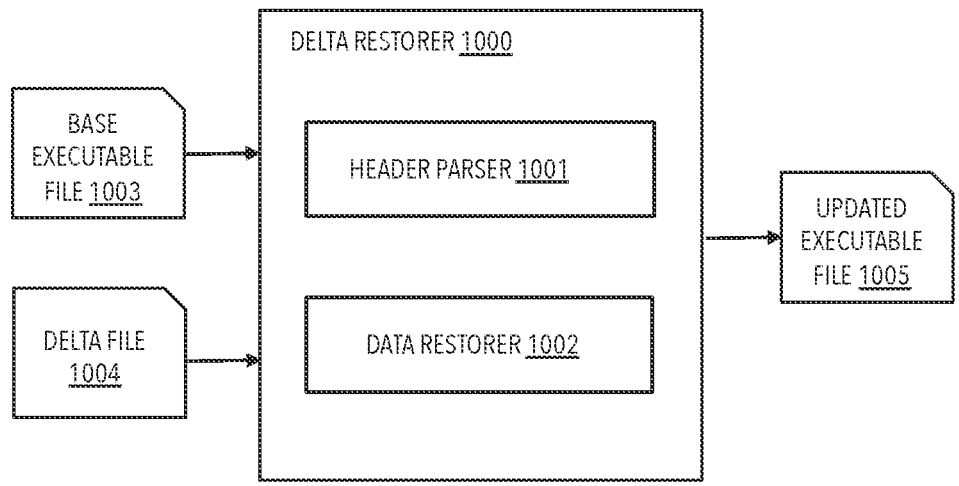
FIG. 10 depicts an example diagram for a delta restorer according to some embodiments of the present invention.

Referring to FIGS. 4 and 5, after the delta generator 700 generates each delta file, the container image 400 may utilize the proposed architecture shown in FIG. 5. When the container image 400 with the architecture shown in FIG. 5 is deployed in a container, the deployment can be executed as for a normal container image deployment except for reading a delta file. FIG. 10 depicts an example diagram for a delta restorer 1000 according to some embodiments of the present invention. A delta restorer 1000 can be a component or a plug-in of the container deployment tool for reading the delta file 1004 and restoring the delta file 1004 to the updated executable file 1005.

When the tool for deploying container images deploys a container image and reads a delta file 1004, the delta restorer 1000 may restore the delta file 1004 to the updated executable file 1005 automatically. As shown in FIG. 10, the delta restorer 1000 may include two components, e.g., a header parser 1001, and a data restorer 1002. The header parser 1001 may be configured to parse the header in the delta file 1004 to obtain the mapping between the updated executable file 1005 and the base executable file 1003. Specifically, the header parser 1001 may parse the header in the delta file 1004 to obtain the paired blocks including locations thereof and the different blocks including locations thereof. Then the data restorer 1002 may restore the updated executable file 1005 based on the delta file 1004 and the base executable file 1003. Specificity, for each specific block in the plurality of blocks in the updated executable file 1005, the data restorer 1002 may input data from a paired block in the base executable file 1003 to the updated executable file 1005 based on a location of the paired block of the base executable file 1003 in response to the specific block being in the paired blocks, and input data in the corresponding specific block of the different blocks in the delta file 1004 to the updated executable file 1005 in response to the specific block being in the different blocks.

Figure 11:
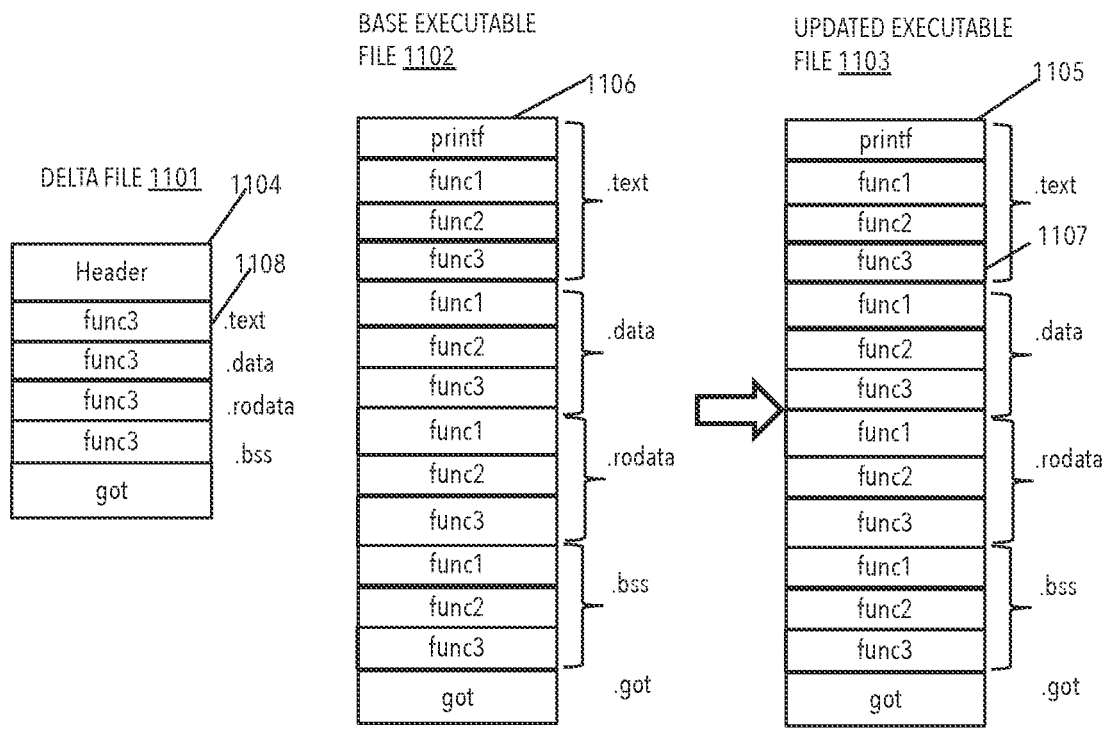
FIG. 11 depicts an example process for restoring a delta file to an updated executable file according to some embodiments of the present invention.

FIG. 11 depicts an example process for restoring a delta file 1101 to an updated executable file 1103 according to some embodiments of the present invention. After the header parser 1001 has parsed the delta file 1101 to obtain information in the header 1104 which may have the file structure in header 901 in FIG. 9, the data restorer 1002 may restore data in each block based on the delta file 1101 and a base executable file 1102. For example, for the first block 1105 (block_index:1), the data restorer 1002 may restore data of the first block 1105 from a corresponding paired block 1106 in the base executable file 1102 as the paired blocks with the same data are indicated in the header 901. In addition, for the fourth block 1107 (block_index:4), the data restorer 1002 may restore data of the fourth block 1107 from data in a corresponding block 1108 in the body 902 as the different blocks are indicated in the header 901, and so on. Then all data in the updated executable file 1103 can be restored. This restore action can be done by the delta restorer 1000 automatically without actions from users. In other words, the restore action is transparent to the users.

It should be noted that the delta generator 700 and/or the delta restorer 1000, according to some embodiments of the present invention, could be implemented by computer system/server 102 of FIG. 1. It also should be noted that the delta generator 700 and/or the delta restorer 1000, according to embodiments of the present invention, could be implemented in any computer system. In some embodiments, the delta generator 700 and/or the delta restorer 1000, according to some embodiments of the present invention, can be a cloud computing environment (such as cloud computing environment 50 from FIG. 2).

Figure 12:
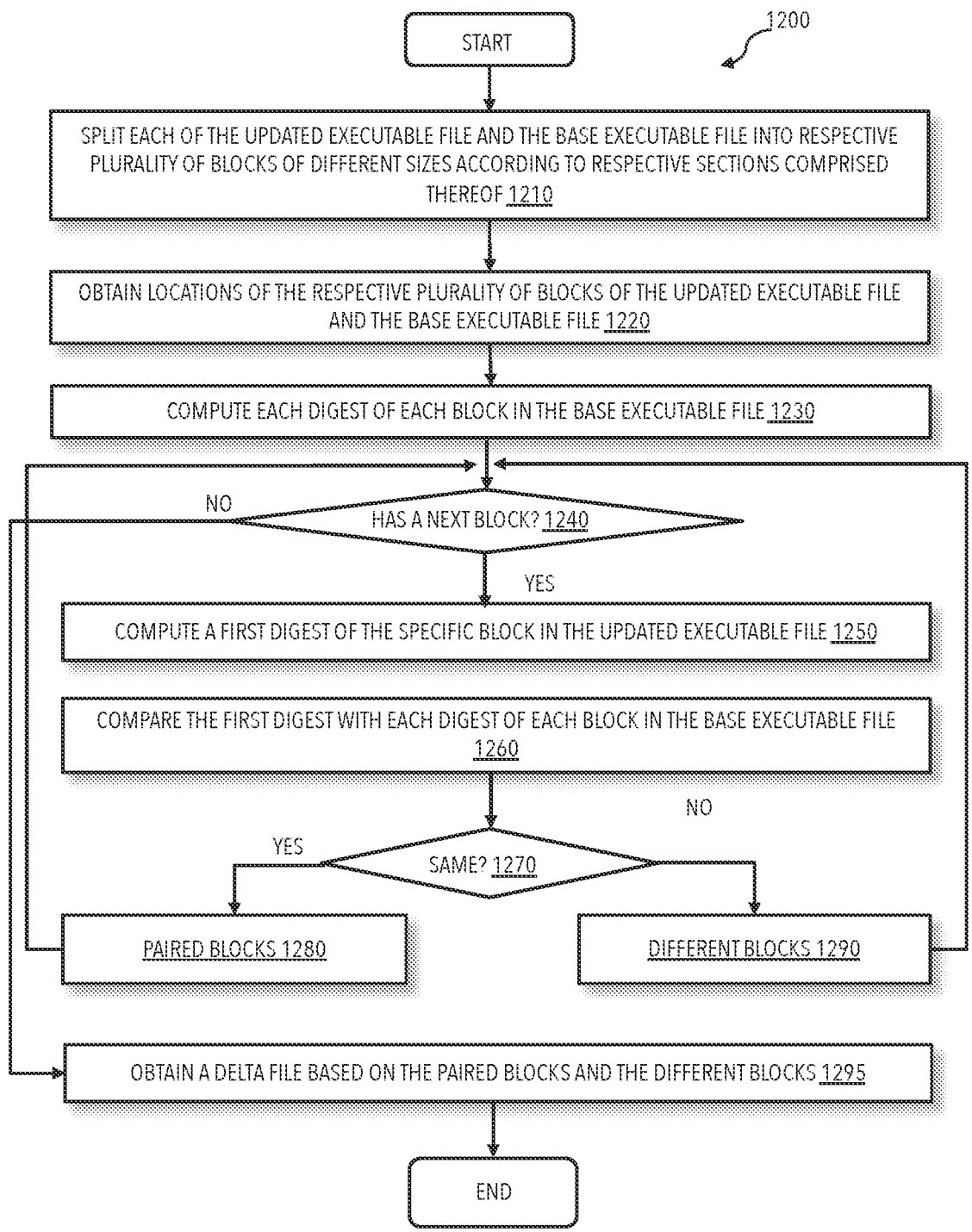
FIG. 12 depicts a flowchart for generating a delta file in a container image according to some embodiments of the present invention.

FIG. 12 depicts a flowchart 1200 for generating a delta file in a container image according to some embodiments of the present invention. The flowchart 1200 may be implemented by the delta generator 700, or other suitable computer/computing systems. For ease of understanding, the flowchart 1200 will be described with reference to FIG. 7.

At 1210, the delta generator 700 may split each of an updated executable file 705 and a base executable file 704 into a respective plurality of blocks according to respective sections comprised thereof, where the base executable file 704 and the updated executable file 705 are files with replicated data, the base executable file 704 is in a lower layer in a container image, and the updated executable file 705 is in a higher layer in the container image. In some embodiments, the action of splitting each of the updated executable file 705 and the base executable file 704 into the respective plurality of blocks according to respective sections comprised thereof is implemented by the linker as described above.

At 1220, the delta generator 700 may obtain locations of the respective plurality of blocks of the updated executable file 705 and the base executable file 704.

At 1230, the delta generator 700 may compute each digest of each block in the base executable file 704.

At 1240, the delta generator 700 may start a loop for each specific block in the updated executable file 705. First, the delta generator 700 may compute a first digest of the specific block in the updated executable file 705 at 1250. Then the delta generator 700 may compare the first digest with each digest of each block in the base executable file 704 at 1260. If the delta generator 700 determines that the first digest is the same as a second digest of a second block in the base executable file 704 at 1270, the delta generator 700 may determine that the specific block and the second block are the paired blocks with the same data at 1280. And if the delta generator 700 determines that the first digest is different from any digest of any block in the base executable file 704 at 1270, the delta generator 700 may determine that the specific block is in the different blocks at 1290. After the loop is ended for all blocks in the updated executable file 705, the delta generator 700 may obtain a delta file 706 based on the paired blocks and the different blocks at 1295. Then the process 1200 is ended. In other words, the delta file 706 is from the updated executable file 705 in a first layer based on the base executable file 704, and the base executable file 704 is in a lower layer than the first layer in the container image, and the delta file 706 is obtained by splitting each of the updated executable files 705 and the base executable file 704 into the respective plurality of blocks based on a respective file structure of the updated executable file 705 and the base executable file 704 and then comparing data in the respective blocks in both the updated executable file 705 and the base executable file 704.

In some embodiments, the delta file 706 includes block mappings between the updated executable file 705 and the base executable file 704, and different data between the updated executable file 705 and the base executable file 704.

In some embodiments, the block mappings between the updated executable file 705 and the base executable file 704 may include indications of paired blocks with the same data between the updated executable file 705 and the base executable file 704, indications of different blocks in the updated executable file 705 with different data from blocks in the base executable file 704, locations of the paired blocks of the base executable file 704, locations of the different blocks of the updated executable file 705, and the different data between the updated executable file 705 and the base executable file 704 including data in each of the different blocks.

Figure 13:
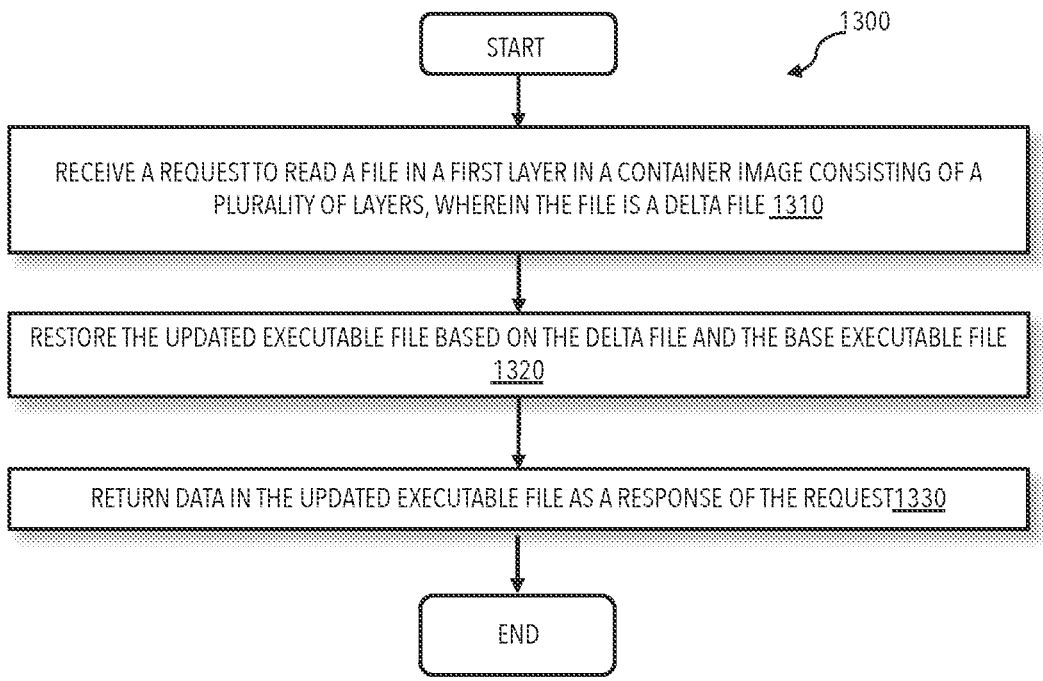
FIG. 13 depicts a flowchart for restoring a delta file to an updated executable file in a container image according to some embodiments of the present invention.

FIG. 13 depicts a flowchart 1300 for restoring a delta file to an updated executable file in a container image according to some embodiments of the present invention. The flowchart 1300 may be implemented by the delta restorer 1000, or other suitable computer/computing systems. For ease of understanding, the flowchart 1300 will be described with reference to FIG. 10.

At 1310, the delta restorer 1000 may receive a request to read a file in a first layer in a container image including a plurality of layers. The file may be a delta file 1004 which is from an updated executable file 1005 based on a base executable file 1003. The base executable file 1003 may be in a lower layer than the first layer in the container image. The delta file 1004 may include block mappings between the updated executable file 1005 and the base executable file 1003 and different data between the updated executable file 1005 and the base executable file 1003. Blocks included in the updated executable file 1005 and the base executable file 1003 may be based on the respective file structure of the updated executable file 1005 and the base executable file 1003.

At 1320, the delta restorer 1000 may restore the updated executable file 1005 based on the delta file 1004 and the base executable file 1003.

At 1330, the delta restorer 1000 may return data in the updated executable file 1005 as a response of the request.

In some embodiments, when restoring the updated executable file 1005 based on the delta file 1004 and the base executable file 1003, for each specific block in the plurality of blocks in the updated executable file 1005, if the specific block is in the paired blocks based on the delta file 1004, the delta restorer 1000 may input data from a paired block in the base executable file 1003 to the updated executable file 1005 based on a location of the paired block of the base executable file 1003. However, if the specific block is in the different blocks based on the delta file 1004, the delta restorer 1000 may input data in the corresponding block of the different blocks in the delta file 1004 to the updated executable file 1005.

In another aspect of the present invention, there is provided a computer-implemented system. The computer-implemented system includes a computer processor coupled to a computer-readable memory unit, where the memory unit includes instructions that when executed by the computer processor implements the above methods 1200 and 1300.

In another aspect of the present invention, there is provided a computer program product. The computer program product includes a computer readable storage medium having program instructions embodied therewith. The program instructions are executable by an electronic device to cause the electronic device to perform actions of the above methods 1200 and 1300.

The present invention may be a system, a method, and/or a computer program product at any possible technical detail level of integration. The computer program product may comprise a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium comprises the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, comprising an object oriented programming language such as Smalltalk, C++, or so on, and procedural programming languages, such as the "C" programming language or similar programming languages. The computer readable program instructions may execute entirely on the user's computer, partly on the user's computer, as a stand-alone software packet, partly on the user's computer and partly on a remote computer or entirely on the remote computer or server. In the latter scenario, the remote computer may be connected to the user's computer through any type of network, comprising a local area network (LAN) or a wide area network (WAN), or the connection may be made to an external computer (for example, through the Internet using an Internet Service Provider). In some embodiments, electronic circuitry comprising, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture comprising instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, by one or more processors, a request to read a file in a first layer in a container image including a plurality of layers, wherein the file is a delta file which is from an updated executable file based on a base executable file, wherein the delta file is added to the container image and replaces the updated executable file in the container image, wherein the base executable file is in a lower layer than the first layer in the container image, and the delta file includes a header and a body, wherein the header includes block mappings between the updated executable file and the base executable file, wherein the block mappings in the header include indications of paired blocks with a same data between the updated executable file and the base executable file and indications of different blocks in the updated executable file with different data from blocks in the base executable file, and the body includes different unduplicated data between the updated executable file and the base executable file, and wherein a plurality of blocks included in the updated executable file and the base executable file are based on a respective file structure of the updated executable file and the base executable file;
   restoring, by the one or more processors, the updated executable file based on the delta file and the base executable file; and
   returning, by the one or more processors, data in the updated executable file as a response of the request.

2. The method of claim 1, wherein the block mappings between the updated executable file and the base executable file include locations of the paired blocks of the base executable file, and locations of the different blocks of the updated executable file.

3. The method of claim 2, wherein restoring the updated executable file based on the delta file and the base executable file further comprises:
   for each specific block of the plurality of blocks in the updated executable file:
      inputting, by the one or more processors, data from a paired block in the base executable file into the specific block of the updated executable file based on a location of the paired block of the base executable file in response to the specific block being in the paired blocks based on the delta file; and
      inputting, by the one or more processors, data in a corresponding block of the different blocks in the delta file into the specific block of the updated executable file in response to the specific block being in the different blocks based on the delta file.

4. The method of claim 1, wherein the delta file is obtained by splitting the updated executable file and the base executable file into a respective plurality of blocks based on the respective file structure of the updated executable file and the base executable file and then comparing data in the respective blocks in both the updated executable file and the base executable file.

5. The method of claim 4, wherein splitting the updated executable file and the base executable file into the respective plurality of blocks based on the respective file structure of the updated executable file and the base executable file further comprises:

splitting, by the one or more processors, the updated executable file and the base executable file into the respective plurality of blocks according to respective sections included in the respective file structure of the updated executable file and the base executable file; and obtaining, by the one or more processors, locations of the respective plurality of blocks of the updated executable file and the base executable file.

6. The method of claim 5, wherein splitting each of the updated executable files and the base executable files into the respective plurality of blocks according to the respective sections included thereof is implemented by a linker or an analysis tool.

7. The method of claim 5, wherein comparing data in the respective blocks in both the updated executable file and the base executable file further comprises:
computing, by the one or more processors, each digest of each block in the base executable file;
for each specific block in the updated executable file:
computing, by the one or more processors, a first digest of the specific block in the updated executable file;
comparing, by the one or more processors, the first digest with each digest of each block in the base executable file;
in response to the first digest being the same as a second digest of a second block in the base executable file, determining, by the one or more processors, the specific block and the second block are paired blocks; and
in response to the first digest being different from any digest of any block in the base executable file, determining, by the one or more processors, the specific block is in different blocks; and
obtaining, by the one or more processors, the delta file based on the paired blocks and the different blocks.

8. A computer-implemented system, comprising a computer processor coupled to a computer-readable memory unit, the computer-readable memory unit comprising instructions that when executed by the computer processor implements a method comprising:
receiving, by one or more processors, a request to read a file in a first layer in a container image including a plurality of layers, wherein the file is a delta file which is from an updated executable file based on a base executable file, wherein the delta file is added to the container image and replaces the updated executable file in the container image, wherein the base executable file is in a lower layer than the first layer in the container image, and the delta file includes a header and a body, wherein the header includes block mappings between the updated executable file and the base executable file, wherein the block mappings in the header include indications of paired blocks with a same data between the updated executable file and the base executable file and indications of different blocks in the updated executable file with different data from blocks in the base executable file, and the body includes different unduplicated data between the updated executable file and the base executable file, and wherein a plurality of blocks included in the updated executable file and the base executable file are based on a respective file structure of the updated executable file and the base executable file;
restoring, by the one or more processors, the updated executable file based on the delta file and the base executable file; and returning, by the one or more processors, data in the updated executable file as a response of the request.

9. The system of claim 8, wherein the block mappings between the updated executable file and the base executable file include locations of the paired blocks of the base executable file, and locations of the different blocks of the updated executable file.

10. The system of claim 9, wherein restoring the updated executable file based on the delta file and the base executable file further comprises:
for each specific block of the plurality of blocks in the updated executable file:
inputting data from a paired block in the base executable file into the specific block of the updated executable file based on a location of the paired block of the base executable file in response to the specific block being in the paired blocks based on the delta file; and
inputting data in a corresponding block of the different blocks in the delta file into the specific block of the updated executable file in response to the specific block being in the different blocks based on the delta file.

11. The system of claim 8, wherein the delta file is obtained by splitting the updated executable file and the base executable file into a respective plurality of blocks based on the respective file structure of the updated executable file and the base executable file and then comparing data in the respective blocks in both the updated executable file and the base executable file.

12. The system of claim 11, wherein splitting the updated executable file and the base executable file into the respective plurality of blocks based on the respective file structure of the updated executable file and the base executable file further comprises:
splitting, by the one or more processors, the updated executable file and the base executable file into the respective plurality of blocks according to respective sections included in the respective file structure of the updated executable file and the base executable file; and
obtaining, by the one or more processors, locations of the respective plurality of blocks of the updated executable file and the base executable file.

13. The system of claim 12, wherein splitting each of the updated executable files and the base executable files into the respective plurality of blocks according to the respective sections included thereof is implemented by a linker or an analysis tool.

14. The system of claim 12, wherein comparing data in the respective blocks in both the updated executable file and the base executable file further comprises:
computing, by the one or more processors, each digest of each block in the base executable file;
for each specific block in the updated executable file:
computing, by the one or more processors, a first digest of the specific block in the updated executable file;
comparing, by the one or more processors, the first digest with each digest of each block in the base executable file;
in response to the first digest being the same as a second digest of a second block in the base executable file, determining, by the one or more processors, the specific block and the second block are paired blocks; and
in response to the first digest being different from any digest of any block in the base executable file, determining, by the one or more processors, the specific block is in different blocks; and obtaining, by the one or more processors, the delta file based on the paired blocks and the different blocks.

15. A computer program product, the computer program product comprising a computer readable storage medium having program instructions embodied therewith, the program instructions executable by an electronic device to cause the electronic device to perform a method, the method comprising:

receiving, by one or more processors, a request to read a file in a first layer in a container image including a plurality of layers, wherein the file is a delta file which is from an updated executable file based on a base executable file, wherein the delta file is added to the container image and replaces the updated executable file in the container image, wherein the base executable file is in a lower layer than the first layer in the container image, and the delta file includes a header and a body, wherein the header includes block mappings between the updated executable file and the base executable file, wherein the block mappings in the header include indications of paired blocks with a same data between the updated executable file and the base executable file and indications of different blocks in the updated executable file with different data from blocks in the base executable file, and the body includes different unduplicated data between the updated executable file and the base executable file, and wherein a plurality of blocks included in the updated executable file and the base executable file are based on a respective file structure of the updated executable file and the base executable file;

restoring, by the one or more processors, the updated executable file based on the delta file and the base executable file; and returning, by the one or more processors, data in the updated executable file as a response of the request.

16. The computer program product of claim 15, wherein the block mappings between the updated executable file and the base executable file include locations of the paired blocks of the base executable file.

17. The computer program product of claim 16, wherein restoring the updated executable file based on the delta file and the base executable file further comprises:

for each specific block of the plurality of blocks in the updated executable file:

inputting, by the one or more processors, data from a paired block in the base executable file into the specific block of the updated executable file based on a location of the paired block of the base executable file in response to the specific block being in the paired blocks based on the delta file; and inputting, by the one or more processors, data in a corresponding block of the different blocks in the delta file into the specific block of the updated executable file in response to the specific block being in the different blocks based on the delta file.

18. The computer program product of claim 15, wherein the delta file is obtained by splitting the updated executable file and the base executable file into a respective plurality of blocks based on the respective file structure of the updated executable file and the base executable file and then comparing data in the respective blocks in both the updated executable file and the base executable file.

19. The computer program product of claim 18, wherein splitting the updated executable file and the base executable file into the respective plurality of blocks based on the respective file structure of the updated executable file and the base executable file further comprises:

splitting, by the one or more processors, the updated executable file and the base executable file into the respective plurality of blocks according to respective sections included in the respective file structure of the updated executable file and the base executable file; and obtaining, by the one or more processors, locations of the respective plurality of blocks of the updated executable file and the base executable file.

20. The computer program product of claim 19, wherein comparing data in the respective blocks in both the updated executable file and the base executable file further comprises:

computing, by the one or more processors, each digest of each block in the base executable file;

for each specific block in the updated executable file:

computing, by the one or more processors, a first digest of the specific block in the updated executable file;

comparing, by the one or more processors, the first digest with each digest of each block in the base executable file;

in response to the first digest being the same as a second digest of a second block in the base executable file, determining, by the one or more processors, the specific block and the second block are paired blocks; and in response to the first digest being different from any digest of any block in the base executable file, determining, by the one or more processors, the specific block is in different blocks; and obtaining, by the one or more processors, the delta file based on the paired blocks and the different blocks.

* * * * *